United States Patent [19]

Moss et al.

[11] 4,134,916
[45] Jan. 16, 1979

[54] N-POLYALKOXYALKYL ACRYLAMIDES OR METHACRYLAMIDES

[75] Inventors: Philip H. Moss; Edward C. Y. Nieh, both of Austin, Tex.

[73] Assignee: Texaco Development Corp., New York, N.Y.

[21] Appl. No.: 875,274

[22] Filed: Feb. 6, 1978

[51] Int. Cl.$^2$ ............... C07C 97/03; C07C 103/133; C07C 103/60
[52] U.S. Cl. .................................. 260/561 N
[58] Field of Search ............................ 260/561 N

[56] References Cited

U.S. PATENT DOCUMENTS

| 3,087,965 | 4/1963 | Dowbenko et al. | 260/561 N |
| 3,280,189 | 10/1966 | Cline et al. | 260/561 N |
| 3,814,741 | 6/1974 | Coporiccio et al. | 260/561 N |

FOREIGN PATENT DOCUMENTS 1101409  1/1968  United Kingdom ............ 260/561 N

Primary Examiner—Allen B. Curtis
Assistant Examiner—Raymond Covington
Attorney, Agent, or Firm—Carl G. Ries; Thomas H. Whaley; James L. Bailey

[57] ABSTRACT

Covers a new composition of matter comprising an acrylamide or methacrylamide monomer characterized by the following structural formula:

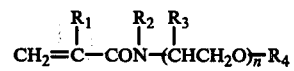

where $R_1$ is hydrogen or methyl, $R_2$ and $R_3$ are hydrogen or lower alkyl, $R_4$ is a primary or secondary alkyl group or an alkaryl group, each group containing 6–25 carbon atoms, and n is an integer ranging from 2 to 30.

4 Claims, No Drawings

N-POLYALKOXYALKYL ACRYLAMIDES OR METHACRYLAMIDES

BACKGROUND OF THE INVENTION

1. Field of the Invention

This invention relates to novel acrylamide or methacrylamide monomers.

2. Description of the Prior Art

It is well known that amines react with acrylic acid chloride or methacrylic acid chloride to yield the corresponding N-substituted acrylamide or methacrylamide. Volatile N-substituted acrylamides are prepared from amines and acrylic acid or acrylic esters by vapor phase processes as described in U.S. Pat. Nos. 2,719,175; 2,719,177 and 2,719,178. Di-substituted acrylamide such as N,N-dialkylacrylamides can be prepared from secondary amines containing alkyl groups with at least 5 carbon atoms as disclosed in U.S. Pat. No. 2,529,838.

It is the object of the invention to prepare a new class of acrylamides and methacrylamides which are useful in a wide variety of end-uses normally calling for monomers of the hydrophobic type.

SUMMARY OF THE INVENTION

The invention relates to acrylamide or methacrylamide monomers characterized by the following formula:

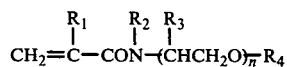

where $R_1$ is hydrogen or methyl, $R_2$ and $R_3$ are hydrogen or lower alkyl, $R_4$ is a primary or secondary alkyl group or an alkaryl group, each group containing 6-25 carbon atoms, and n is an integer ranging from 2 to 30.

DESCRIPTION OF THE PREFERRED EMBODIMENTS

The compounds of the invention described above may be prepared utilizing a number of known synthetic techniques. One typical mode of preparation involves first providing an acrylic or methacrylic compound having the structure:

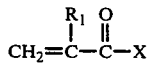

where X is halo, OH or $-OR_5$ where $R_5$ is lower alkyl, with $R_1$ being hydrogen or methyl. The acrylic or methacrylic compound thus may be an acid ester or acid halide. When the acid halide is employed it is preferred that an acid chloride be utilized such that X in the above formula is chloro. When the ester form is utilized it is greatly preferred that the methyl or ethyl ester be used as a reactant.

The above acrylic or methacrylic compounds are then or reacted with a polyalkoxyalkylamine having the structure:

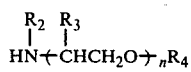

where $R_2$, $R_3$, and $R_4$, and n have a significance as just described. When $R_2$ and $R_3$ are lower alkyl it is preferred that they contain 1-4 carbon atoms.

While the hydrophobic radical $R_4$ may be alkyl or alkaryl containing 6-25 carbon atoms it is preferred that said radical contained from 6-18 carbon atoms. It is particularly preferred that $R_4$ be an aliphatic hydrocarbon radical containing 8-14 carbon atoms and that the radical be a linear alkyl radical. While the average value for n may range from 2-30 the range from 2-13 is especially preferred. Since said polyalkoxyalkylamines are prepared by alkoxylating hydroxy-containing materials, such as an aliphatic hydrocarbon alcohol initiator, this then results in a mixture of alkoxylates having different chain lengths. Thus the values for n are considered average values, as is well understood by those skilled in the art.

As stated, the preferred base compounds from which the polyalkoxyamines are prepared are long chain, preferably linear, alcohols having from 6 to about 18 carbon atoms and the compounds are prepared by alkoxylating (ethoxylating or propoxylating) such alcohols with at least one mole of preferably propylene oxide to provide the precursor to the amine used in the preparation of the compounds of this invention.

The alcohols are standard items of commerce derived from any of several processes including hydrogenation of acids or esters from natural fats, the so-called "Ziegler" alcohol process, the hydroformylation of olefins, or the oxidation of paraffins. While it is preferable that the alcohol used be substantially linear in nature, some branching may be present in the alkyl portion of the molecule.

The alkoxylation reaction is conducted by those methods well known to those skilled in the art by reacting the alcohol with propylene or ethylene oxide or a mixture of these, preferably propylene oxide in the presence of an acid or alkali catalyst, usually an alkaline material such as potassium hydroxide, for example. After the reaction is concluded, the alkaline catalyst is neutralized with an acid and the product recovered.

The alkoxylated alcohols are reacted with ammonia using a known method of ammonolysis such as, for example, that described in U.S. Pat. No. 3,654,370, wherein the propylene oxide adduct of a polyhydric material is reacted with ammonia in the presence of a hydrogenation-dehydrogenation catalyst to form polyether diamines and higher amines. The preferable catalyst for the ammonolysis will be one containing nickel, copper and chromium as described, for example, in U.S. Pat. No. 3,152,998. This catalyst is generally prepared by the reduction of a mixture of the oxides of nickel, copper and chromium in the presence of hydrogen at a temperature within the range of about 250 to 400° C. Calculated on an oxide-free basis, the catalyst contains from 60 to 85 mole percent nickel, 14 to 37 mole percent copper and 1 to 5 mole percent chromium. A particularly preferred catalyst composition is one containing 70 to 80 mole percent nickel, 20 to 25 mole percent copper and 1 to 5 mole percent chromium.

The ammonolysis reaction is generally conducted at a temperature of from about 100° C. to about 300° C. and a pressure of about 500 to 5000 psig created at least in part by the pressure of hydrogen introduced into the reaction vessel. Ammonia is introduced into the reaction such that there is a minimum of one mole of ammonia per hydroxyl group to be aminated. It is preferable that an excess be present, usually from 10 to 30 moles ammonia per hydroxyl group. The reaction can be conducted either as a batch or continuous reaction.

Other methods of ammonolysis are known to those of ordinary skill in the art which are satisfactory to provide the amino alkoxy aliphatic hydrocarbon to be used to produce the compounds of this invention.

The acrylic or methacrylic acid or derivative is added in approximately equivalent quantities with the aminated propoxylate even though an excess of the acid may be used, say up to two to three times the molar amounts of the amine.

The reaction is usually conducted in the presence of an azeotropic agent such as benzene, xylene, toluene, and the like, which form an azeotrope with water to drive the reaction to completion.

The reaction is conducted, with mixing, at from about 150° C. to about 300° C. The reaction is generally conducted under autogenous pressure, but pressures from about ambient to about 10 atmospheres can be used. In like manner, reduced pressures as low as 10 mm Hg. may be employed. In some instances the reaction may be conducted under a blanket of nitrogen or some other inert gas.

Usually a free radical inhibitor of the aromatic amine or aromatic hydroxy compound type should be utilized in carrying the above described reaction. Typical of these are phenothiazine, N,N'-diphenyl-p-phenylenediamine, N,N'-dinaphthyl-p-phenylene diamine, hydroquinone, p-methoxyphenol, butylphenol, etc.

The following example illustrates preparation of a typical compound falling within the scope of the invention. It is understood that this example is merely illustrative and that the invention is not to be limited thereto.

EXAMPLE I

JEFFAMINE ® M-300 (a polyalkoxyalkyamine available from Jefferson Chemical Co. prepared from linear $C_{10}$ to $C_{12}$ alkyl primary alcohols by base- catalyzed propoxylation and followed by Ni-Cu-Cr catalyzed reductive amination, with an average molecular weight of 300), 300 g; methacrylic acid, 190 g; hydroquinone, 0.5 g; N,N'-diphenyl-p-phenylenediamine, 2 g; and mixed xylene, 100 ml, were reacted under a nitrogen atmosphere at 170° to 178° C. in a 500 ml, 3 necked flask equipped with stirrer, thermometer, Dean-Stark trap and condenser. Over a period of five and a half hours, by-product water, 18 g was collected in the Dean-Stark trap. The reaction product after cooling to room temperature was dissolved in approximately 1.5 l of ether. Excess methacrylic acid and inhibitors were removed by successive washes with 2N sodium hydroxide, 2N hydrochloric acid and water. The ethereal solution was further treated with several 5 g portions of activated carbon and dried over calcium sulfate. Removal of ether by distillation afforded the polyalkoxyalkyl methacrylamide, 356 g as a bottoms product.

The above described compounds which contain a hydrophobic group are particular useful as a component of copolymers which have surfactant or emulsifying properties. The monomer can also be used in preparing interpolymers which may be employed to improve dispersing properties of lubricating oils and to provide resistance to hardening of diene rubbers such as natural rubber.

Likewise, the monomers, homopolymers or copolymers thereof may be used as additives in a number of processes or employed per se to produce a variety of manufactured articles. For example, solutions of resulting polymers may be cast or spun into shaped articles, sheets, films, wrapping tissues, tubing, filaments, yarns, threads, etc. Also, aqueous or alcoholic solutions of polymers made from the monomers described here may be used in coating, finishing, casting or molding for adhesion or lamination. Specifically, they may be used as adhesives for cellophane, paper, cloth, etc., as finishes for fabrics, as permanent sizes for yarns, as protective water resistant coverings, for use as sausage casings, as dye intermediates, as filament film formers, etc. The polymers may also find excellent use as anchoring agents for natural and synthetic filaments, films and artificial leather. They may also be used to finish and impregnate or coat by surface modification or other manipulative techniques a number of industrial and commercial articles.

While the invention has been described in connection with specific embodiments thereof, it will be understood that it is capable of further modification, and this application is intended to cover any variations, uses or adaptations of the invention following, in general, the principles of the invention and including such departures as come within known or customary practice in the art to which the invention pertains and as may be applied to the essential features hereinbefore set forth, and as fall within the scope of the invention and the limits of the appended claims.

We claim:

1. An acrylamide or methacrylamide monomer characterized by the following structural formula:

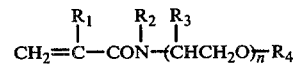

where $R_1$ is hydrogen or methyl, $R_2$ and $R_3$ are hydrogen or lower alkyl, $R_4$ is a primary or secondary alkyl group or an alkaryl group, each group containing 6–25 carbon atoms, and n is an integer ranging from 2 to 30.

2. The monomer of claim 1 where $R_4$ is $C_6$–$C_{18}$.
3. The monomer of claim 2 where $R_4$ is $C_8$–$C_{14}$.
4. The monomer of claim 1 where n is 2–13.